United States Patent
Criou et al.

(10) Patent No.: US 8,463,830 B2
(45) Date of Patent: Jun. 11, 2013

(54) KEYWORD-BASED CONTENT SUGGESTIONS

(75) Inventors: Nathalie Criou, San Francisco, CA (US); Chandramouli Mahadevan, Bangalore (IN); Sridhar Venkatakrishnan, Bangalore (IN)

(73) Assignee: Google Inc., Mountain View, CA (US)

( * ) Notice: Subject to any disclaimer, the term of this patent is extended or adjusted under 35 U.S.C. 154(b) by 331 days.

(21) Appl. No.: 11/620,421

(22) Filed: Jan. 5, 2007

(65) Prior Publication Data
US 2008/0168032 A1  Jul. 10, 2008

(51) Int. Cl.
G06F 7/00 (2006.01)
G06F 17/00 (2006.01)
G06F 17/30 (2006.01)

(52) U.S. Cl.
USPC .................... 707/899; 707/708; 707/723

(58) Field of Classification Search
USPC ............. 707/3–5, 771; 709/203, 204, 223, 709/224, 217; 705/26, 27, 37
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,826,572 B2 * | 11/2004 | Colace et al. | 707/10 |
| 6,876,997 B1 | 4/2005 | Rorex et al. | |
| 6,985,882 B1 | 1/2006 | Del Sesto | |
| 7,013,323 B1 * | 3/2006 | Thomas et al. | 709/203 |
| 7,039,599 B2 | 5/2006 | Merriman | |
| 7,136,875 B2 | 11/2006 | Anderson et al. | |
| 7,567,958 B1 * | 7/2009 | Alspector et al. | 1/1 |
| 7,801,896 B2 * | 9/2010 | Szabo | 707/739 |
| 2005/0050027 A1 | 3/2005 | Yeh et al. | |
| 2005/0137939 A1 * | 6/2005 | Calabria et al. | 705/26 |
| 2005/0149396 A1 * | 7/2005 | Horowitz et al. | 705/14 |
| 2006/0149710 A1 * | 7/2006 | Koningstein et al. | 707/3 |
| 2008/0109285 A1 * | 5/2008 | Reuther et al. | 705/7 |

FOREIGN PATENT DOCUMENTS

| | | |
|---|---|---|
| KR | 10-2006-0008656 | 1/2006 |
| WO | WO 97/21183 | 6/1997 |

OTHER PUBLICATIONS

U.S. Appl. No. 95/001,073, filed Sep. 30, 2004, Reexamination of Stone et al.
U.S. Appl. No. 95/001,061, filed Sep. 3, 2002, Reexamination of Stone et al.

(Continued)

Primary Examiner — Susan Chen
(74) Attorney, Agent, or Firm — Fish & Richardson P.C.

(57) ABSTRACT

A system and related methods suggest content based on user input and another metric. In one implementation, web-sites are suggested to advertisers in response to keyword input and by factoring in how often such web-sites were selected or "clicked on" as a result of corresponding search queries. Search logs are processed to determine how often certain query terms led to web-sites being selected. Web-sites are ranked accordingly. Keywords from advertisers are matched to the web-site rankings to present the top web-sites.

9 Claims, 3 Drawing Sheets

OTHER PUBLICATIONS

U.S. Appl. No. 95/001,069, filed Jul. 11, 2002, Reexamination of Dean et al.
U.S. Appl. No. 95/001,068, filed Dec. 7, 2002, Reexamination of Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.

* cited by examiner

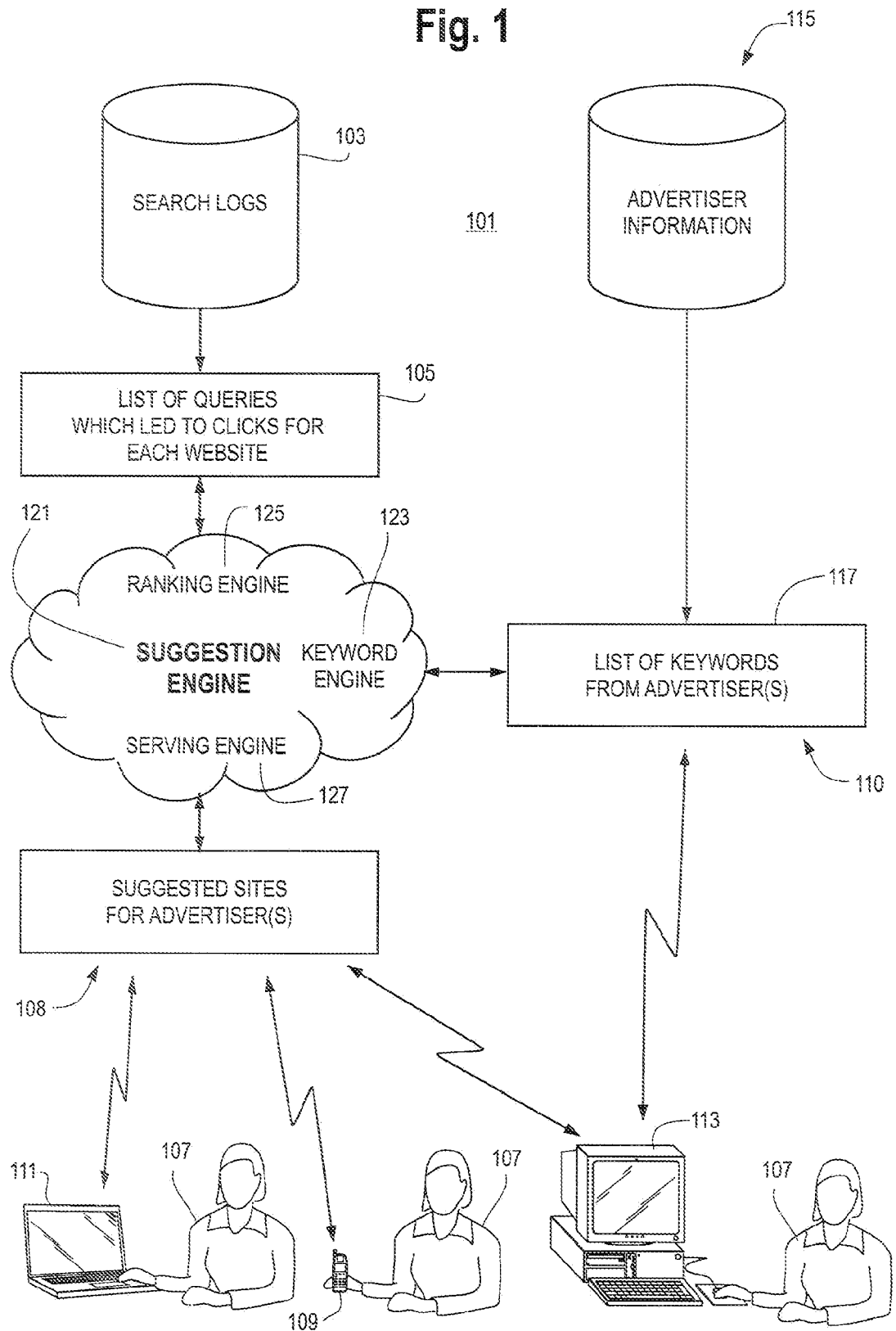

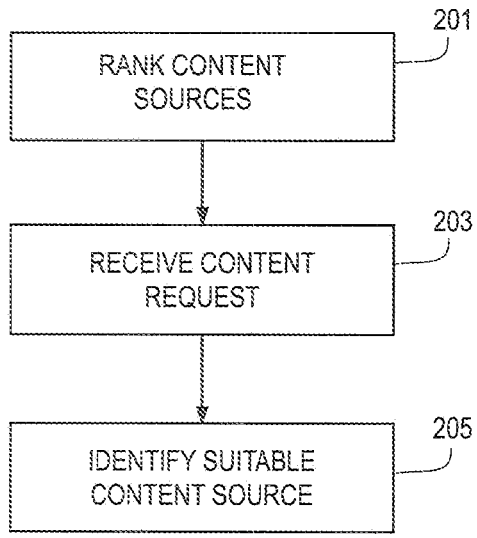
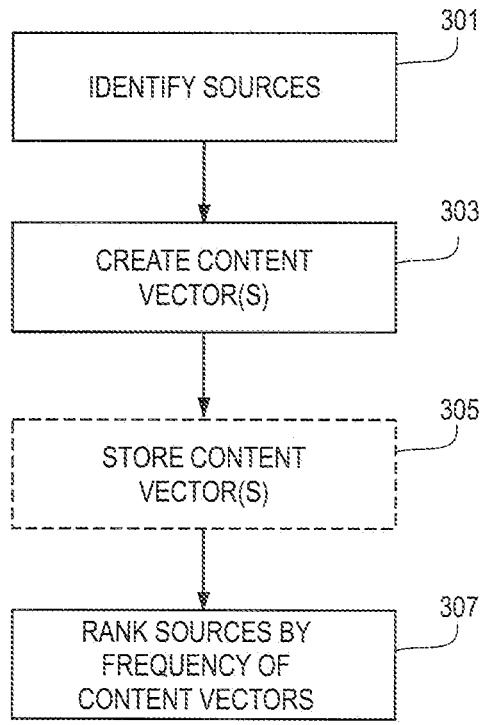
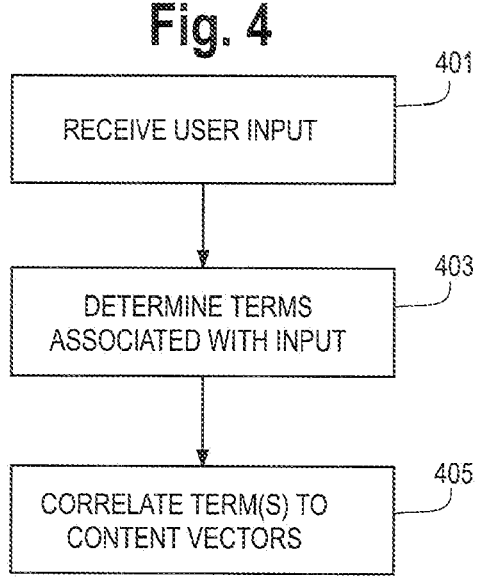

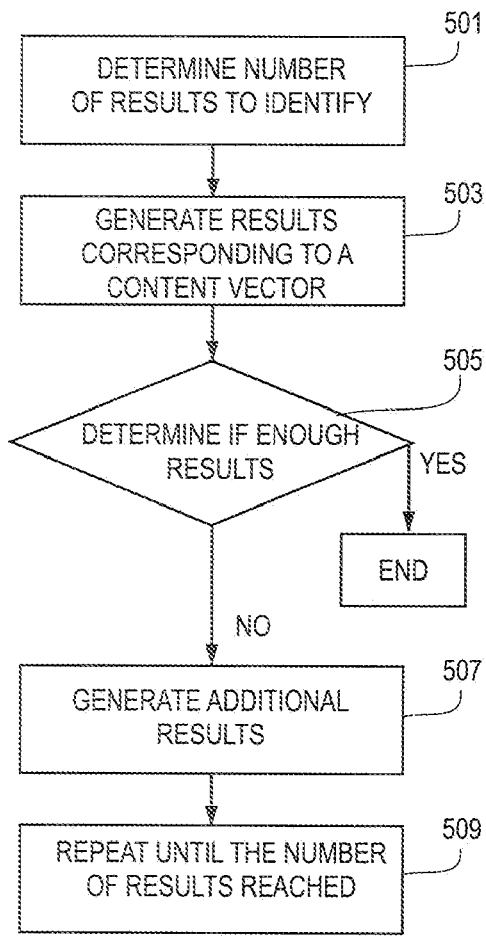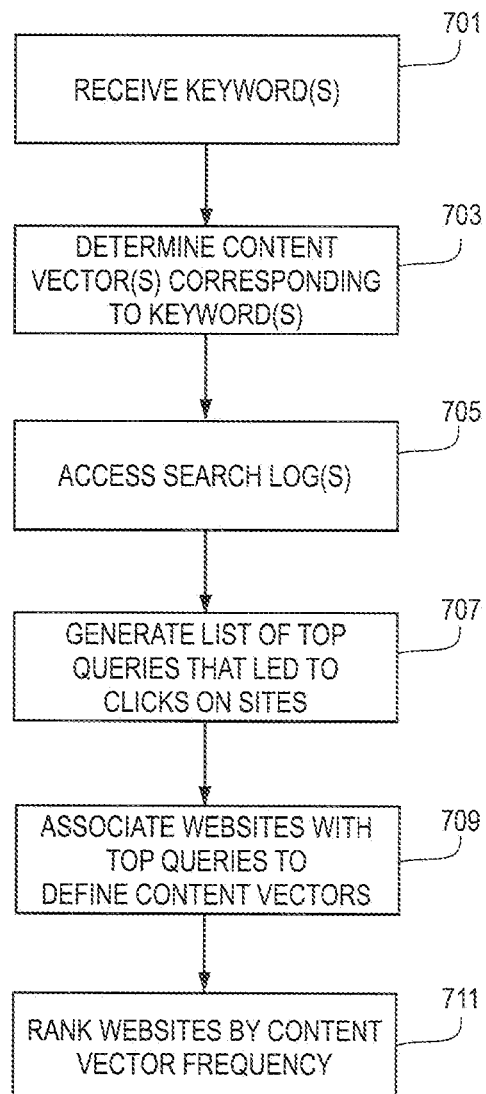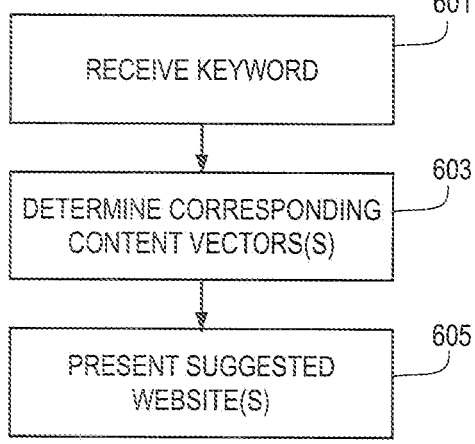

KEYWORD-BASED CONTENT SUGGESTIONS

TECHNICAL FIELD

The subject matter of this document relates to advertising.

BACKGROUND

Interactive or on-line advertising provides opportunities for advertisers to target their advertisements ("ads") to a receptive audience. For example, the contents of user-inputted queries have been used by search engines to deliver relevant ads in conjunction with search results, the relevancy being a function of the query inputted by the user.

Certain tools exist to assist advertisers in targeting advertisements. For example, the web-based application, Google ADWORDS, permits an advertiser to identify certain web-sites that contain certain subject matter, that are listed in certain pre-defined categories, or which are similar in content to a given URL.

SUMMARY

According to one implementation, a site-suggestion method involves receiving input corresponding to at least one keyword associated with a content request (e.g., an on-line advertisement request). At least one suggested content source is indicated for the advertisement based on whether the suggested content source was previously selected in a previous query corresponding to the keyword.

In another aspect, a term is determined from the previous query and corresponding to the keyword received. A content source is indicated for the content request (e.g., the on-line advertisement) including selecting a content source associated with the term.

In still another implementation, the content sources suggested comprise web-sites.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a schematic of one implementation of a content suggestion system.

FIGS. 2-7 are flowcharts of various, possible methods related to suggesting a content source.

Like reference symbols in the various drawings indicate like elements.

DETAILED DESCRIPTION

FIG. 1 is a schematic of one implementation of a suggestion system for content sources. Although any number of content sources may be contemplated herein, in the exemplary implementation described, the content sources are of the form of web-sites accessible through the Internet, including the world-wide web. One function of suggestion system 101, diagrammed in FIG. 1, is to suggest appropriate web-sites for advertisers to place their ads. Suggestion system 101 factors in user behavior, such as how frequently users have selected (e.g., clicked on) web-sites, in its determination of which web-sites to suggest.

System 101 includes one or more suggestion engines 121 to perform its behavior-based suggestion routines. For example, suggestion engine 121 may include a keyword engine 123 which functions to receive one or more keywords 117 from advertisers 107, processes them, and identifies content vectors (explained below) associated with such keywords. A ranking engine 125 processes one or more lists of queries 105 which led to clicks on web-sites and extracts information from such queries to define content vectors. Rankings of content, such as web-sites, are stored in a suitable data structure. A serving engine 127 delivers the results of these processes to clients of system 101, such as advertisers 107, such results comprising, for example, suggested sites 108.

One suitable implementation for system 101 is through a world-wide-web based application utilizing one or more servers, including a server associated with advertisement management. In one implementation, suggestion system 101 uses "folksonomy," or the popularity of web-sites, in its suggestions to advertisers. One way of assessing web-site popularity, or tapping into this "folksonomy," is to analyze which queries led users to select a web-site. To make this assessment search logs 103 are suitably processed, such as by using sawzall scripts across multiple computers, a process generally described in "Interpreting the Data: Parallel Analysis with Sawzall" [http://labs.google.com/papers/sawzall.html], the teachings of which are incorporated by reference.

One suitable approach to search log processing is now described. For each query, if the query resulted in selection of a web-site, suitable programming extracts from the log data corresponding to the domain of the web-site. The foregoing selection and its query/domain pair are counted as one selection, such as a click. The selections (e.g. clicks) for all query/domain pairs are aggregated. The aggregation results in a map from a query/domain pair to the total number of selections for that pair.

The logs are processed to determine, rank, or otherwise list the most frequent or "top" queries which led to clicks on respective sites (block 105). This permits the related determination, for each site, of the top terms associated with respective sites. Terms can be a word or phrase of any length suitable to generate, ultimately, an appropriate number of suggested web-sites to an advertiser or other user. In some implementations, single- or two-word phrases (referred to in the art as unigrams or bigrams) can be used. It is understood that system 101 can be adaptive in its processing of search logs 103, that is, varying the length of terms associated with sites as needed for the particular advertiser, content area, or any other parameter.

One suitable methodology for processing search logs includes generating the top 500 queries that led to clicks on the site by processing 10 days in each of the twelve preceding months. This reduces temporal effects on a site. Of course, other data samples and time periods can be used, as can the entire database over a period of time. One- and two-word phrases associated with sites are then determined from the top queries. The one-, two-, or n-word terms derived from this processing create content vectors, in that the terms point to web-sites that users, as a folksonomy, have clicked on after making a query. It will be appreciated that content vectors corresponding to a query can include those matching the query identically or partially, the vector being a subset of the query; an inexact match; synonym; formative; or term having any other suitable correspondence for purposes of capturing the query with a term. Similarly, in some implementations, common words and common search terms, referred to as "stopwords," are eliminated from query phrases in processing the search logs.

Suggestion system 101 interacts with advertisers 107 and advertiser information 115. It will be appreciated that advertiser information 115 may include data corresponding to a vast number of variations in on-line advertising, including ad placement, content, form, frequency, impressions, and the like, just as there are countless types of on-line ad campaigns, as the spirit or creativity of advertisers may devise.

Advertisers 107 may provide or access information 115 or interface with suggestion system 101 through a variety of electronic devices, such as PDAs 109, laptops 111, or larger computers 113, and over various networks, such as wireless or cabled, LAN, WAN, internet, or, in this implementation, the world-wide web.

One of the interactive features of system 101 is to receive input from advertisers 107 seeking to determine on which web-sites to place their ads, and presenting suggested web-sites in response to such requests. To perform this function, system 101 receives one or more keywords which may be listed by advertisers (block 117), and presents suggested sites corresponding to such keywords (block 119), factoring in the rankings (block 105) determined by processing search logs 103, as discussed previously.

One exemplary process for suggesting content sources is discussed generally with reference to FIG. 2. Content sources, e.g. web-sites, are ranked, (block 201) as a function of any suitable metric related to user behavior. One such metric is the popularity of such content source, and one suitable indication of such popularity is the number of times the web-site was selected as a result of a query using certain terms, e.g., content vectors. A client, e.g., a potential advertiser, requests a content source (block 203), e.g. a web-site, for purpose of interacting or transacting therewith. Such interactions may include bidding on, purchasing, or otherwise considering the placement of an advertisement in connection with such web-site, and one approach to making such request is entering one or more keywords.

After receiving the content requests, suitable content sources are identified (block 205) based on both the request and the ranking of the content source described previously. As one example, one or more web-sites are suggested based on the ranking thereof by popularity of the content vector corresponding to the keywords entered.

The process of ranking content sources (block 201) is further described with reference to FIG. 3. Content sources are identified (block 301), such as by access to a network, database, and the like. Information associated with the content sources is suitably processed to yield one or more content vectors (block 303), which are optionally stored (block 305). The content sources are ranked as a function of how frequently content vectors are associated with the content sources (block 307).

The process of receiving a content, request (block 203) is further described with reference to FIG. 4. User input is received (block 401), such input generally associated with obtaining a desired output to guide a subsequent user action. More specifically, a user inputs data, such as one or more keywords, in any suitable manner, which data is further processed in conjunction with other data. A determination of which term(s) to associate with the user input is made (block 403), and a correlation between such terra(s) and the content vectors is made (block 405).

The process of identifying one or more suitable content sources (block 205) is further described with reference to FIG. 5. A determination of the number (e.g. a threshold) of results, e.g. content sources, occurs in block 501. Suitable processing generates results corresponding to a content vector (block 503). A determination is made whether enough results have been found (block 505). If so, the process ends, optionally presenting results, e.g. content sources, to the user. If not, additional results are generated corresponding to one or more additional content vectors (block 507). Results are generated until the number of results determined in block (501) is reached (block 509).

The above-outlined processes are suitable for a variety of applications. For example, one exemplary process for suggesting content sources is discussed generally with reference to the flowchart of FIG. 6. One or more keywords are received (block 603), directly or indirectly, from an advertiser or other user seeking to target its advertisements among multiple ad placement options. The advertiser may have bid on the keyword, input the keyword, selected it from a list of available keywords, or otherwise transmitted data corresponding to the keyword. The keyword is suitably processed to determine one or more corresponding content vectors (block 603), which, as mentioned previously, can correspond to queries which led to clicks on web-sites. A predetermined number K of web-sites corresponding to the content vectors are presented (block 605). If web-sites have been ranked by how often they have been selected in conjunction with the given content vector, the number K of web-sites which are returned to the advertiser may also correspond to the top K web-sites. One or more of the suggested web-sites can be selected for further use in creating an ad campaign.

To generate the top K web-sites, one suitable approach is to determine one or more two-word, content vectors corresponding to the keyword(s) received. Suitable processing, either independently of receiving keywords or in conjunction therewith, cause particular sites to be ranked by the number of times the content vector led to site selection. If this approach yields K web-site recommendations, there is no need to consult the one-word content vectors. Otherwise, web-site recommendations are made using one-word content vectors until the desired number of recommendations has been generated. Since single-term content vectors may or may not be accurate indicators of a desired metric of user behavior (e.g., popularity), additional processing, such as suggesting sites in a round-robin fashion, may be employed to enhance diversity of the suggested sites and otherwise improve the quality of the recommendations.

FIG. 7 is a flowchart of another possible method of suggesting web-sites. As in the method previously described in relation to FIG. 6, one or more keywords are received (block 701) and one or more corresponding content vectors are determined (block 703). Search logs are accessed (block 705) to generate a list of top queries that led to clicks or selections of web-sites (block 707). Content vectors corresponding to the top queries are defined and associated with web-sites (block 709). Web-sites are ranked by how many times content vectors resulted in such web-sites being selected ("clicked on") (block 711). The web-site rankings determined in block 711 are accessed for the content vectors extracted from the advertiser keywords in block 703. The top web-sites, as ranked, and up to K in number, are suggested (block 715).

One suitable approach to determining content vectors corresponding to the top queries and to the advertiser keywords is now described. Since a query and an advertiser's keywords can both be a sequence of one or more words, the same or similar algorithm may be used to generate corresponding content vectors. For each word sequence, a weight is assigned. A list of all single-word or two-word phrases contained in the sequence is generated. The weight assigned to the sequence is likewise assigned to each of the single-word or two-word phrases generated, multiplied by their frequency of occurrence. The resulting list may then be ordered according to the assigned weights, so that content vectors for the top queries or keywords may be determined. For queries, the assigned weight may factor in the number of selections (e.g., clicks) that resulted from the query on the domain under consideration. For an advertiser keyword, the assigned weight may factor in the number of time the advertiser may have used that keyword previously.

It can be appreciated from the foregoing exemplary methods that there can be considerable variation not only in the processes and their applications, but also in the order of processing data herein. In other words, the order in which certain processes have been described in this document should not be construed as limiting the process to such order. Rather, different implementations and applications may perform one or more processes in an order different from that described and illustrated in FIGS. 2-7, including parallel processing, interactive processing, and adaptive processing. Thus, as just one example, accessing and processing of search logs, such as in blocks 705, 707, 709, and 711, may precede receipt of keywords (block 701), be performed in parallel, may follow keyword receipt or other processing, or may be interspersed with keyword processing or even with other advertisement related functions.

A variety of hardware and software configurations are suitable for implementing processes for suggesting web-sites as a function of how often they have been selected from search results. System 101 (FIG. 1) is one such implementation, and can make use of one or more suitably programmed servers accessible to advertisers through the world-wide web. A suitable user interface, such as those shown in FIG. 1, may be provided for interacting with advertisers 107. Any suitable memory or data structures can be associated with or accessible by system 101 if needed to perform its site suggesting functions and related processing.

Search logs 103 are stored in a suitable data structure. Programming and hardware for processing search logs 103 to yield web-site rankings may be independent from other programming of system 101 or may be associated therewith, depending on the implementation. Similarly, system 101 may or may not need access to advertiser information 115 for interacting with advertisers 107, depending on the nature of the implementation.

Software for suggestion system 101 may be implemented in a variety of ways. For example, programming of systems 101 may be implemented as a relatively independent, web-based application; as part of a suite of tools for creating on-line ad campaigns; as a feature to an existing site-selection tool; or in any number of other variations. Accordingly, depending on the implementation, the site suggestion processes of system 101 may be performed independently of other site selection methodologies, or may occur in conjunction with such methodologies. As such, suggestion system 101 may incorporate or work in conjunction with ranking, categorization, taxonomy, or other filtering methodologies for web-site selection in creating ad campaigns.

Web-sites suggested by system 101 may not only be incorporated directly by an advertiser into an ad campaign, but could also serve as inputs to other site selection or ad creation processes.

In one implementation, site suggestion system 101 is another tool or feature to assist advertisers using web-based, advertisement creation products by Google, such as Google ADWORDS. In such implementation, system 101 may work in conjunction with a site selection tool or other program features to target ads.

Alternatively, a site suggestion system can be implemented by an advertiser or by an advertising agency primarily for the benefit of that advertiser's or agency's campaigns. In such implementation, batch data from search logs could be provided to the advertisers or agency, and the suggestion system would interact with employees or agents of the advertiser or agency to present suggestions.

A number of embodiments of the invention have been described. Nevertheless, it will be understood that still further variations and modifications may be made without departing from the spirit and scope of the invention. Accordingly, other embodiments are within the scope of the following claims.

What is claimed is:

1. A computer-implemented method comprising:
   identifying, by a computer system, at least one advertiser keyword that an advertiser has associated with an advertisement;
   in response to identifying the at least one advertiser keyword:
      identifying, by the computer system and from a plurality of user submitted search queries, a set of matching search queries that match the at least one advertiser keyword;
      for each of one or more user search queries in the set of matching search queries:
         identifying a set of web-sites that were identified by search results previously provided for the user search query; and
         determining, for each of two or more web-sites in the set of identified web-sites, a total number of users that clicked on the search results that identified the web-site;
      ranking, by the computer system, each of the two or more web-sites in the set of identified web-sites based on the total number of users that clicked on the search results for the web-site;
      selecting, by the computer system, at least one of the two or more web-sites as a suggested web-site for which presentation of the advertisement on the web-site is suggested, the suggested web-site being selected based on the ranking of the two or more web-sites; and
      providing, by the computer system and to the advertiser, a list identifying the suggested web-site.

2. The method of claim 1, wherein:
   identifying a set of web-sites comprises:
      creating, by the computer system, a keyword content vector for the at least one keyword, the keyword content vector including phrases that are included in the at least one keyword;
      creating, by the computer system, content vectors for two or more web-sites, the content vector for each web-site including phrases that were included in the search queries that preceded user clicks on the search results for the web-site; and
      identifying, as the set of web-sites, the two or more web-sites having content vectors that match the keyword content vector.

3. The method of claim 1, further comprising receiving, from the advertiser, a selection of at least one suggested web-site from the list, the selection by the advertiser indicating that the advertisement is available for presentation with the selected web-site in response to a user request for presentation of the selected web-site.

4. The method of claim 1, wherein selecting a set of suggested web-sites comprises selecting the set of web-sites having at least a minimum ranking.

5. A computer implemented method of targeting an on-line advertisement, comprising:
   receiving, by a computer system and from the advertiser, a keyword for an advertisement, the keyword being one or more words;
   in response to receiving the keyword from the advertiser:
   determining, by the computer system, a content vector for the keyword, the content vector including at least one word from the keyword;
   identifying, by the computer system, data specifying a search query that matches the content vector, data specifying a plurality of search queries that were received from users, and data specifying whether the users selected search results that were provided, based on the search queries, to the users;
   identifying, by the computer system and based on the identified data, web-sites that have been requested by the users through the users' clicks on the search results and a total number of times that each of the web-sites has been requested through the users' clicks on the search results;
   selecting, by the computer system and for the advertiser, a set of suggested web-sites for which presentation of the advertisement on the web-site is suggested;
   providing, by the computer system and to the advertiser, information identifying a list of suggested web-sites, from the set of suggested web-sites, for targeting presentation of the advertisement, the list of suggested web-sites being a list of the suggested web-sites on which presentation of the advertisement is suggested, each suggested web-site being included in the list of suggested web-sites based on a total number of times that the suggested web-site was requested through the users' clicks on the search results; and
   enabling selection, by the advertiser and from the list of suggested web-sites, of one or more of the suggested web-sites as web-sites on which the advertisement will be presented.

6. The method of claim 5, further comprising:
   accessing a data structure that includes data indicating a number of times the content vector occurred in previous queries that resulted in selections of the web-sites; and
   ranking the web-sites according to the number of times each web-site was selected in response to a query in which the content vector occurred.

7. The method of claim 6, wherein a threshold number of ranked web-sites are presented based on the number of times the web-sites were selected in response to a query in which the content vector occurred.

8. The method claim 5, further comprising determining a set of content vectors corresponding to the at least one keyword, wherein providing information to the advertiser identifying the suggested web-sites includes identifying the suggested web-sites based on the set of content vectors for the at least one keyword.

9. A computer-implemented method, comprising:
   receiving user search queries for which search results for web-sites were provided to users and data specifying a number of the users that clicked on the search results;
   creating, by one or more computers and based on the data, first content vectors for the web-sites, each first content vector for each website including phrases from the search queries that were submitted by the users that clicked on the search results for the web-site, the first content vector for each web-site further specifying a total number of users that clicked on the search results for the web-site, the creating comprising:
   for at least one web-site:
      creating a two-word phrase that is included in the search queries that were submitted by the users that clicked on the search results for the at least one web-site;
      creating two or more one-word phrases that are included in the search queries that were submitted by the users that clicked on the search results for the web-site; and
      creating a first content vector that includes the two-word phrase and the two or more one-word phrases, wherein creating the first content vector that includes the two-word phrase and the two or more one-word phrases comprises assigning weights to the two-word phrase and the two or more one-word phrases, the assignment of weights being based on total numbers of clicks on the search results for the at least one web-site when the search results were provided in response to phrases that are included in the first content vector;
   receiving, from an advertiser, two or more phrases;
   creating, by the one or more computers, a second content vector for the two or more phrases, comprising:
      creating one or more two-word phrases that are included in the two or more phrases;
      creating two or more one-word phrases that are included in the two or more phrases;
      creating a second content vector that includes the one or more two word phrases and the two or more one-word phrases; and
      assigning a weight to each phrase that is included in the second content vector, the weight assigned to each respective phrase being based on a number of times that the advertiser has used the respective phrase to target advertisements;
   selecting, by the one or more computers, a set of the web-sites having the first content vectors that match the second content vector; and
   providing, by the one or more computers, a list of suggested web-sites to the advertiser, the list of suggested web-sites specifying one or more web-sites in the set based on the total number of users that clicked on the search results for the web-sites in the set.

* * * * *

UNITED STATES PATENT AND TRADEMARK OFFICE
CERTIFICATE OF CORRECTION

PATENT NO. : 8,463,830 B2  
APPLICATION NO. : 11/620421  
DATED : June 11, 2013  
INVENTOR(S) : Criou et al.

Page 1 of 1

It is certified that error appears in the above-identified patent and that said Letters Patent is hereby corrected as shown below:

In the Claims

Claim 8, Column 7, Line 53 – delete "method claim" and insert -- method of claim --, therefor.

Signed and Sealed this  
Seventeenth Day of September, 2013

Teresa Stanek Rea  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,463,830 B2 | Page 1 of 1 |
| APPLICATION NO. | : 11/620421 | |
| DATED | : June 11, 2013 | |
| INVENTOR(S) | : Nathalie Criou et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 472 days.

Signed and Sealed this
Nineteenth Day of May, 2015

Michelle K. Lee
*Director of the United States Patent and Trademark Office*